US012696354B1

(12) United States Patent
Zhang

(10) Patent No.: US 12,696,354 B1
(45) Date of Patent: Jul. 28, 2026

(54) ILLUMINATED WAX MELT WARMER

(71) Applicant: Huaxin (Dongguan) Technology Co., Ltd., Dongguan (CN)

(72) Inventor: Haibin Zhang, Dongguan (CN)

(73) Assignee: Huaxin (Dongguan) Technology Co., Ltd., Dongguan (CN)

( * ) Notice: Subject to any disclaimer, the term of this patent is extended or adjusted under 35 U.S.C. 154(b) by 0 days.

(21) Appl. No.: 19/358,338

(22) Filed: Oct. 14, 2025

(30) Foreign Application Priority Data

Sep. 26, 2025 (CN) ........................ 202522088864.X

(51) Int. Cl.
*H05B 3/26* (2006.01)
*H05B 1/02* (2006.01)

(52) U.S. Cl.
CPC ............. *H05B 3/26* (2013.01); *H05B 1/0252* (2013.01); *H05B 2203/035* (2013.01)

(58) Field of Classification Search
CPC .... A61L 9/03; A61L 9/02; H05B 3/26; H05B 1/0252; H05B 2203/035
See application file for complete search history.

(56) References Cited

U.S. PATENT DOCUMENTS 9,206,963 B2 12/2015 Hsiao
2008/0130266 A1* 6/2008 DeWitt ..................... A61L 9/12 422/123
2018/0339079 A1* 11/2018 Li ........................... A61L 9/032
2021/0086219 A1* 3/2021 Hsiao ........................ B08B 3/08
2023/0226240 A1 7/2023 Ma
2025/0235571 A1 7/2025 Hsiao

* cited by examiner

*Primary Examiner* — Brian W Jennison

(57) ABSTRACT

An illuminated wax melt warmer includes a base, a bowl, a heating element, a light and a circuit board. The bowl includes a cavity, and the heating element is arranged at the bottom of the bowl and on the side facing away from the cavity. The heating element and the light are respectively electrically connected to the circuit board. The bowl is configured to accommodate fragrance wax and to melt the fragrance wax under the heating of the heating element.

14 Claims, 12 Drawing Sheets

ILLUMINATED WAX MELT WARMER

RELATED APPLICATIONS

The present patent document claims the benefit of priority to Chinese Patent Application No. 202522088864.X, filed Sep. 26, 2025, the entire content of which is incorporated herein by reference.

BACKGROUND

1. Technical Field

The present application relates to the field of aromatherapy technology, and in particular to an illuminated wax melt warmer.

2. Background Information

Fragrance wax is different from traditional candles. The natural plant essential oils it contains emit a pleasant fragrance when melted. It has the effect of soothing nerves, purifying the air and eliminating odors.

BRIEF SUMMARY

An embodiment of the present application provides an illuminated wax melt warmer for solving at least one technical problem in the conventional technique.

The illuminated wax melt warmer includes: a base, wherein a chamber is provided at the top of the base, and an inner tube is provided in the middle of the chamber; a bowl including a cavity, wherein an outer tube is provided in the middle of the cavity, the outer tube extends upward from the bottom of the cavity, the bowl is placed in the chamber, and the outer tube is fitted onto the outside of the inner tube; a heating element arranged on the bowl; a light mounted on the top of the inner tube; and a circuit board, wherein the heating element and the light are electrically connected to the circuit board, wherein the cavity is configured to accommodate fragrance wax, and the bowl melts the fragrance wax under the heating of the heating element.

In some embodiments, a vertically upward protruding structure is provided at the bottom of the cavity, and the protruding structure is configured to increase the contact area between the bowl and the fragrance wax.

In some embodiments, the protruding structure includes a plurality of thermally conductive columns, each thermally conductive column extends vertically upward from the bottom of the cavity.

In some embodiments, the plurality of thermally conductive columns includes at least two thermally conductive columns of different heights.

In some embodiments, the protruding structure includes a stepped outer tube, the outer tube includes at least two steps and extends upward from the bottom of the cavity with a stepwise decrease in diameter.

In some embodiments, a portion of the heating element extends into the protruding structure.

In some embodiments, the illuminated wax melt warmer further includes a cylindrical outer cover, the bottom of the cylindrical outer cover is detachably sleeved over the outside of the base.

In some embodiments, the illuminated wax melt warmer further includes a lock assembly, the lock assembly including a lock tongue, a first guide hole, and a lock hole, the first guide hole is provided on a side of the base, and the lock hole is provided on a side of the bottom of the outer cover. The lock tongue is arranged on the base, and the lock tongue includes an extended state where the locking tongue selectively extends out of the first guide hole and a retracted state where the locking tongue is retracted from the first guide hole into the base. The outer cover is sleeved on the base, and the first guide hole is aligned with the lock hole. When the lock tongue is in the extended state, the lock tongue can be inserted into the lock hole to lock the outer cover on the base. When the lock tongue is in the retracted state, the lock tongue can be disengaged from the lock hole to release the restriction of the lock assembly on the outer cover.

In some embodiments, the lock assembly further includes a guide rod and an elastic member, the lock tongue is arranged at a first end of the guide rod, and the elastic member applies an elastic force to the guide rod to keep the lock tongue in the extended state.

In some embodiments, an end plate is provided at the first end of the guide rod, and the guide rod and the locking tongue are fixed on opposite sides of the end plate; a button is provided on the end plate, and the button and the locking tongue are located on the same side of the end plate. The base is provided with a second guide hole, and when the lock tongue is in the extended state, the button can extend from the second guide hole, and applying a pressing force to the button can cause the lock tongue to be transformed into the retracted state.

In some embodiments, the elastic member includes a spring, which is sleeved over the outside of the guide rod, and one end of the spring abuts against the end plate and applies elastic force to the end plate.

In some embodiments, a slope is provided on the side of an end of the locking tongue that is inserted toward the outer cover.

In some embodiments, a key housing is provided on the side of the base, a first notch is provided on one end of the cover facing the base, the cover is sleeved over the top of the base, and at least a portion of the key housing is embedded in the first notch.

In some embodiments, a power interface is provided on the side of the base, and the power interface is electrically connected to the circuit board. A second notch is provided at one end of the outer cover facing the base, and the outer cover is sleeved over the top of the base, and at least a portion of the power interface is embedded in the second notch.

In some embodiments, the base is provided with at least one button, and each button is electrically connected to the circuit board.

BRIEF DESCRIPTION OF THE DRAWINGS

The drawings and descriptions that constitute part of this application are intended to provide a further understanding of this application. The exemplary embodiments and descriptions of this application are intended to explain this application and do not constitute an improper limitation on this application in which.

DESCRIPTION OF REFERENCE NUMERALS

Figure 1:
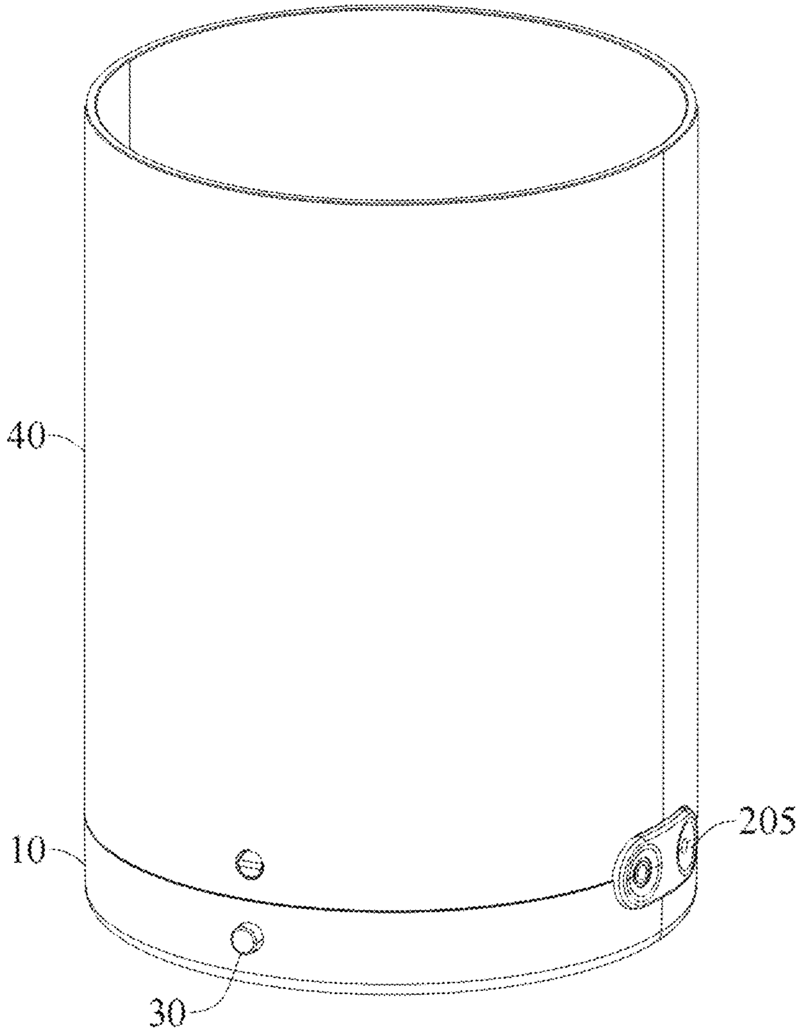
FIG. 1 is a schematic diagram of an overall structure of an illuminated wax melt warmer with an outer cover according to an embodiment of the present application.

10—base; 101—upper housing; 1011—chamber; 1012—inner tube; 1014—first through hole; 1015—second through hole; 1016—first guide hole; 102, 102*a*, 102*c*—bowl; 1021—cavity; 1022—bowl bottom; 1023, 1023*a*, 1023*b*—outer tube; 1024, 1024*a*—thermally conductive columns; 10241—first thermally conductive column; 10242—second thermally conductive column; 1025—flange; 103—lower housing; 1031—second guide hole; 104—limiting ring; 1041—connecting column; 1042—screw;

201—circuit board; 202, 202*a*—heating element; 2021—first part; 2022—second part; 2023—third part; 203—light; 2031—core unit; 2032—lightshade; 204—power interface; 205—key; 2051—heating key; 2052—light key; 2053—key housing; 30—lock assembly; 301—lock tongue; 3011—bevel; 302—guide rod; 303—button; 304—end plate; 305—receiving slot; 3051—first half-slot; 3052—second half-slot; 306—limiting hole; 3061—first half-hole; 3062—second half-hole; 307—spring; 40—outer cover; 401—keyhole; 402—first notch; 403—second notch; 50—fragrance wax; 501—through hole; 51—fragrance wax; 511—through hole.

DETAILED DESCRIPTION OF THE DRAWINGS AND THE PRESENTLY PREFERRED EMBODIMENTS

The present application will be described in detail below with reference to the accompanying drawings and in conjunction with the embodiments. Each example is provided by way of explanation of the present application and does not limit the present application. In fact, it will be clear to those skilled in the art that modifications and variations can be made in the present application without departing from the scope or spirit of the present application. For example, a feature shown or described as part of one embodiment can be used in another embodiment to produce yet another embodiment. Therefore, it is expected that the present application includes such modifications and variations within the scope of the appended claims and their equivalents.

In the description of this application, the terms "longitudinal", "transverse", "up", "down", "front", "back", "left", "right", "vertical", "horizontal", "top", "bottom", etc. indicate orientations or positional relationships based on the orientations or positional relationships shown in the accompanying drawings. They are only for the convenience of describing this application and do not require that this application be constructed and operated in a specific orientation. Therefore, they should not be construed as limitations on this application. The terms "connect", "couple", and "set" used in this application should be understood in a broad sense. For example, they can be fixed connections or detachable connections; they can be directly connected or indirectly connected through intermediate components; they can be wired electrical connections, radio connections, or wireless communication signal connections. For ordinary technicians in this field, the specific meanings of the above terms can be understood according to specific circumstances.

One or more examples of the present application are shown in the accompanying drawings. The detailed description uses numbers and letters to refer to features in the drawings. Like or similar numbers in the drawings and the description have been used to refer to like or similar parts of the present application. As used herein, the terms "first," "second," and "third," etc., are used interchangeably to distinguish one component from another and are not intended to indicate the position or importance of an individual component.

As shown in FIG. 1 to FIG. 5, according to an embodiment of the present application, an illuminated wax melt warmer is provided. The illuminated wax melt warmer includes a base 10, with a cylindrical outer cover 40 disposed above the base 10. The base 10 includes an upper housing 101 and a lower housing 103. The upper housing 101 includes a chamber 1011. The chamber 1011 is located at the top portion of the upper housing 101. An inner tube 1012 is disposed in the middle of the chamber 1011. The inner tube 1012 extends upward from the bottom of the chamber 1011. A bowl 102 is provided in the upper housing 101. The bowl 102 includes a cavity 1021 for accommodating fragrance wax. An outer tube 1023 is disposed in the middle of the cavity 1021. The outer tube 1023 extends upward from the bottom of the cavity 1021. The bowl 102 is embedded within the chamber 1011, and the outer tube 1023 of the bowl 102 is sleeved over the outside of the inner tube 1012. The base 10 includes a circuit board 201 and a heating element 202 electrically connected to the circuit board 201. The circuit board 201 is provided with a temperature control circuit for controlling the heat generated by the heating element 202. To facilitate wiring, a first through hole 1014 is provided at the bottom of the chamber 1011. A cable connecting the heating element 202 and the circuit board 201 can pass through the first through hole 1014.

In the present application, the heating element 202 is disc-shaped and is disposed at the bottom of the bowl 102 and on the side facing away from the cavity 1021. The heating element 202 can heat the bowl 102 and make the bowl 102 reach a preset temperature so that the fragrance wax in the bowl 102 melts and emits fragrance. The electric heating elements in the heating element 202 include, but are not limited to, at least one of a heating wire, a thermistor, a conductive coating, an electric heating tube, a heating film, and a PTC ceramic. In order to facilitate heat conduction, in the embodiment of the present application, the material of the bowl 102 is aluminum or an aluminum alloy. In some embodiments, other materials with good thermal conductivity can also be selected, and no specific restrictions are made here.

In some embodiments, the control method of the temperature control circuit includes controlling the power of the heating element 202, the heating time, the heating area, etc. In some embodiments, the circuit board 201 is electrically connected to a temperature sensor, and the temperature sensor is placed on the bowl 102 or installed on the heating element 202. The temperature control circuit can adjust the working mode of the heating element 202 according to the temperature collected by the temperature sensor. In addition, in the early stage of melting of the fragrance wax, the output power of the heating element 202 can be appropriately increased to ensure that the temperature of the bowl 102 is greater than the melting point of the fragrance wax to speed up the melting of the fragrance wax. After the fragrance wax is partially or completely melted, the output power of the heating element 202 is lowered, and it is ensured that the temperature of the bowl 102 is slightly greater than or equal to the melting point temperature of the fragrance wax. At this temperature, not only can the fragrance wax continue to emit fragrance, but the loss of electrical energy is also reduced.

Figure 5:
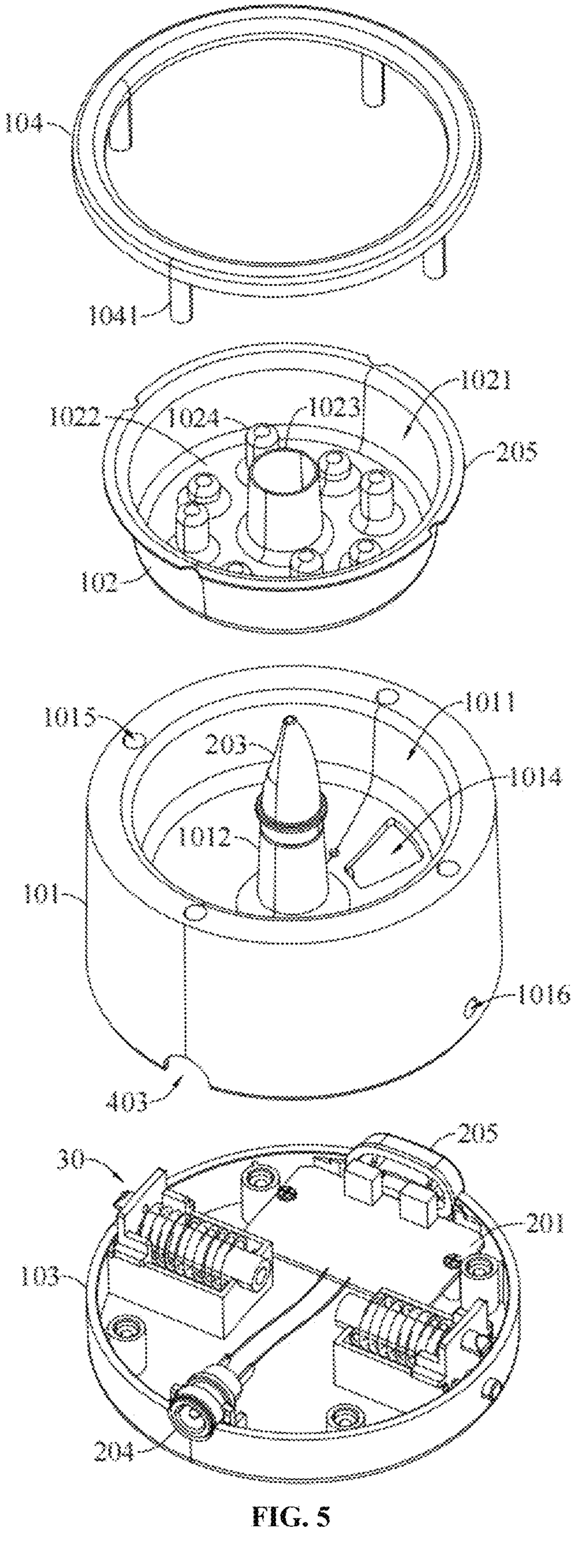
FIG. 5 is an exploded schematic diagram of a base in an embodiment of the present application.
Figure 6:
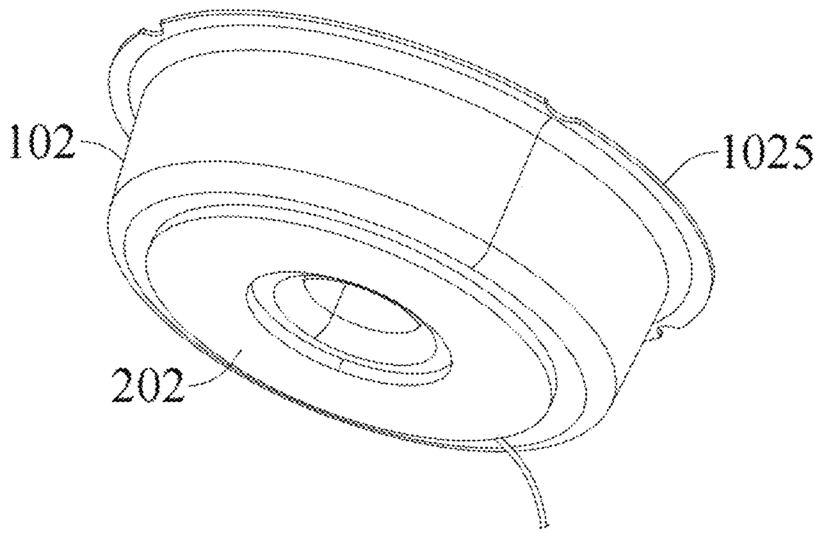
FIG. 6 is a schematic structural diagram of a first type of bowl according to an embodiment of the present application.
Figure 7:
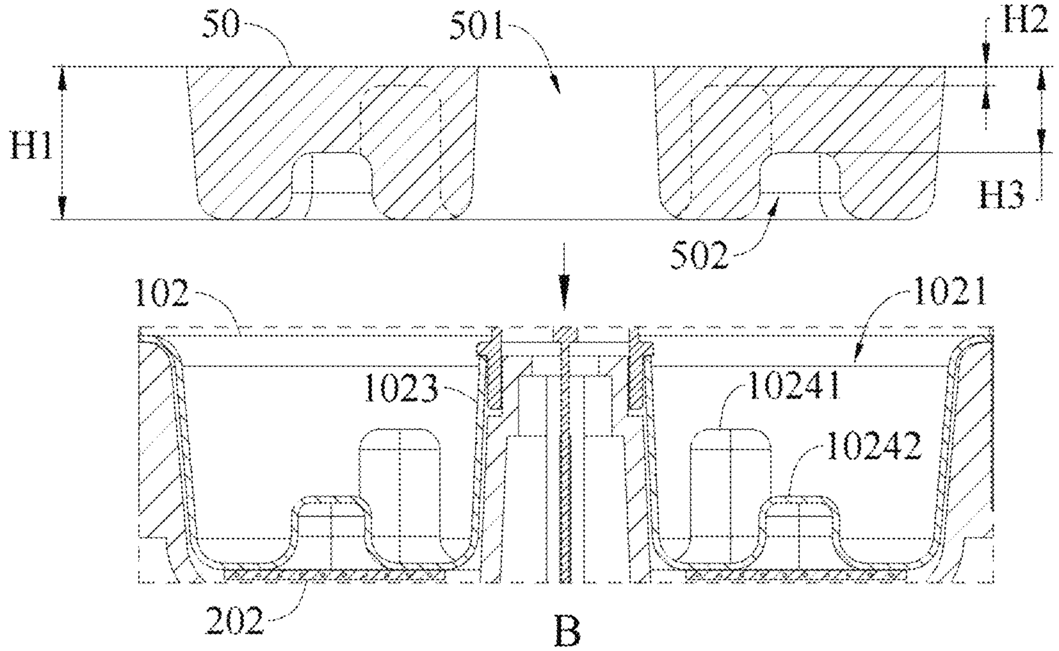
FIG. 7 is a partial enlarged schematic diagram of point B in FIG. 4 and a corresponding cross-sectional view of fragrance wax.

In addition to the temperature of the bowl 102 affecting the melting speed of the fragrance wax, the contact area between the bowl 102 and the fragrance wax also affects the melting speed. Therefore, to increase the contact area between the bowl 102 and the fragrance wax, in some embodiments, as shown in FIGS. 5 to 7, the bottom of the cavity 1021 is provided with a plurality of upwardly protruding thermally conductive columns 1024. Accordingly, the shape of the fragrance wax 50 matches the cavity 1021 of the bowl 102 and the plurality of thermally conductive columns 1024 thereon.

Specifically, as shown in FIG. 7, the fragrance wax 50 is annular, with a through-hole 501 in the center that clearance-fitted onto the outside of the outer tube 1023. Multiple grooves 502 are provided on the side of the fragrance wax 50 facing the bottom of the cavity 1021. These grooves 502 are clearance-fitted onto the multiple thermally conductive columns 1024. The fragrance wax 50 can be fully embedded within the cavity 1021 of the bowl 102, and the multiple thermally conductive columns 1024 can be inserted into the corresponding grooves 502. The multiple thermally conductive columns 1024 are all part of the bowl 102. The multiple thermally conductive columns 1024 extend upward, increasing the contact area between the bowl 102 and the fragrance wax 50, while also reducing the heated thickness of at least a portion of the fragrance wax, thereby effectively improving melting efficiency and overall performance. In some applications, the fragrance wax 50 has an initial thickness before use. Generally, the height of the extended thermally conductive columns 1024 is less than or equal to the initial thickness of the fragrance wax 50.

Additionally, the fragrance wax 50 melts first at its bottom and/or sides, and the solid portion of the fragrance wax 50 would block the release of the fragrance. However, the fragrance wax 50 above the thermally conductive columns 1024 is relatively thin, allowing the fragrance wax 50 above the thermally conductive columns 1024 to melt quickly and penetrate the bowl 102 during heating, thereby resolving the issue of the solid portion of the fragrance wax 50 blocking the release of the fragrance.

In some embodiments, the plurality of thermally conductive columns 1024 has different heights. As shown in FIG. 7, the plurality of thermally conductive columns 1024 includes a taller, first thermally conductive column 10241 and a shorter, second thermally conductive column 10242. Accordingly, the fragrance wax 50 has grooves 502 corresponding to the first thermally conductive column 10241 and the second thermally conductive column 10242. As the fragrance wax 50 is consumed during use, its thickness gradually decreases, and the first thermally conductive column 10241 will extend through the fragrance wax 50 before the second thermally conductive column 10242. Only with continued use, the second thermally conductive column 10242 will extend through the top of the fragrance wax 50.

Furthermore, the multiple thermally conductive columns 1024 also reduce the heated thickness of the fragrance wax 50. As shown in FIG. 7, in a vertical direction, the thickness of the fragrance wax 50 at its thickest point is H1. The thickness of the fragrance wax 50 corresponding to the top surface of the first thermally conductive column 10241 is H2, and the thickness of the fragrance wax 50 corresponding to the top surface of the second thermally conductive column 10242 is H3. Clearly, $H1>H3>H2$. Furthermore, in a horizontal direction, the thermally conductive columns 1024 also reduce the heated thickness of the fragrance wax 50. Different heated thicknesses also affect the melting speed of the fragrance wax 50, and thus the speed of fragrance volatilization.

In some embodiments, the thermally conductive columns 1024 and the bowl 102 are integrally formed, and the integral forming method includes die casting, stamping, 3D printing technology, etc. In some embodiments, the thermally conductive columns 1024 and the bowl 102 are separate structures and fixed together by welding or other methods.

As shown in FIG. 5, in some embodiments, a power interface 204 is mounted on the base 10. The power interface 204 is electrically connected to the circuit board 201, and the power interface 204 is electrically connected to a power adapter. The types of the power interface 204 include, but are not limited to, a circular DC interface, a USB interface, and the like, and are not specifically limited herein. The circuit board 201 is provided with at least one button 205, including a heating button 2051, for controlling the operating state of the heating element.

Figure 8:
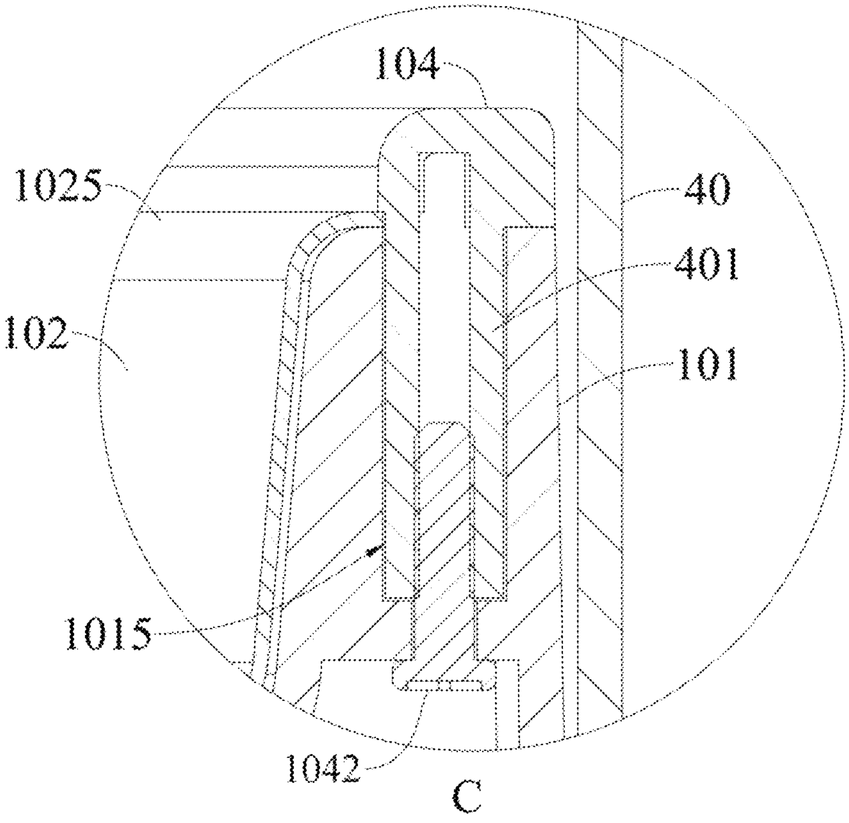
FIG. 8 is a partial enlarged schematic diagram of point C in FIG. 4.

As shown in FIGS. 5, 6, and 8, to facilitate assembly and replacement of the bowl 102 on the base 10, in some embodiments, the bowl 102 is removably mounted within the chamber 1011 of the base 10. Specifically, the edge of the bowl 102 is provided with a flange 1025 extending radially outward and circumferentially. A retaining ring 104 is provided above the base 10. The retaining ring 104 can be selectively mounted on the top of the base 10 and constrains at least a portion of the flange 1025 between the retaining ring 104 and the base 10, thereby confining the bowl 102 within the chamber 1011 of the base 10. More specifically, the retaining ring 104 is provided with four connecting posts 1041. The top of the base 10 is provided with four second through holes 1015. The four connecting posts 1041 are inserted into the corresponding four second through holes 1015 and secured with screws 1042 at their ends with the second through holes 1015.

Figure 9:
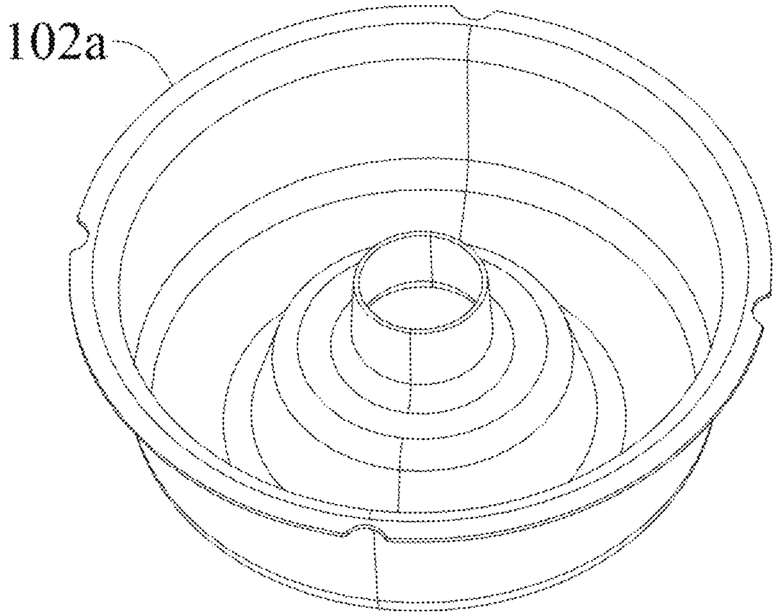
FIG. 9 is a schematic structural diagram of a second type of bowl according to an embodiment of the present application.
Figure 10:
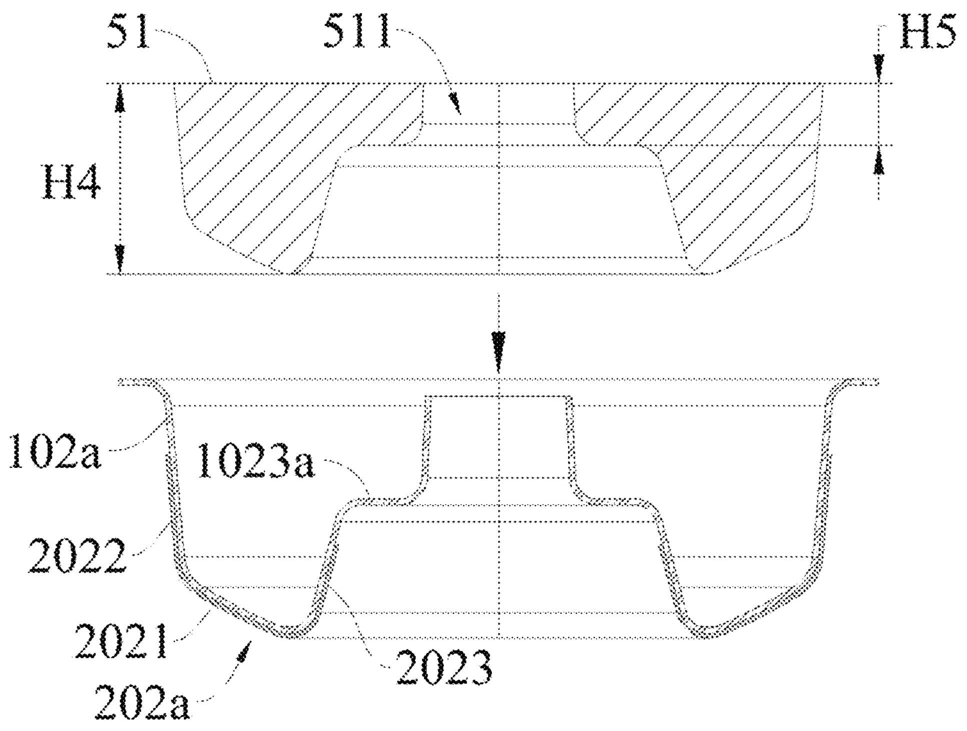
FIG. 10 is a cross-sectional view taken along a direction of FIG. 9.

The present application can be adapted to bowls of different structures to meet different needs. As shown in FIGS. 9 and 10, the present application provides a second bowl 102*a*, and the outer tube 1023*a* in the middle of the bowl 102*a* is a stepped structure with two layers. Correspondingly, the through hole 511 of the fragrance wax 51 has a stepped structure that is adapted to the shape of the outer tube 1023*a*. As can be seen from FIG. 10, in the vertical direction, the upper layer thickness H5 of the fragrance wax 51 is less than the maximum thickness H4 of the fragrance wax 51. Therefore, the purpose of the stepped structure is still to reduce the thickness of at least a portion of the fragrance wax 51, which includes the thickness in the vertical direction and the thickness in the radial direction. In some other embodiments, the outer tube 1023*a* is also designed as a stepped structure with three or more layers, so that the fragrance wax 51 has more levels in the vertical and horizontal directions.

Furthermore, as shown in FIG. 10, in some embodiments, the heating element 202*a* on the bowl 102*a* includes three parts: a first part 2021 located at the bottom of the bowl 102*a*; a second part 2022 extending from the first part 2021 toward the side of the bowl 102*a*; and a third part 2023 extending from the first part 2021 toward the outer wall of the outer tube 1023*a*. The heating element 202*a* of this embodiment further expands the coverage area on the bowl 102*a*, which helps to increase the speed of fragrance volatilization.

Figure 11:
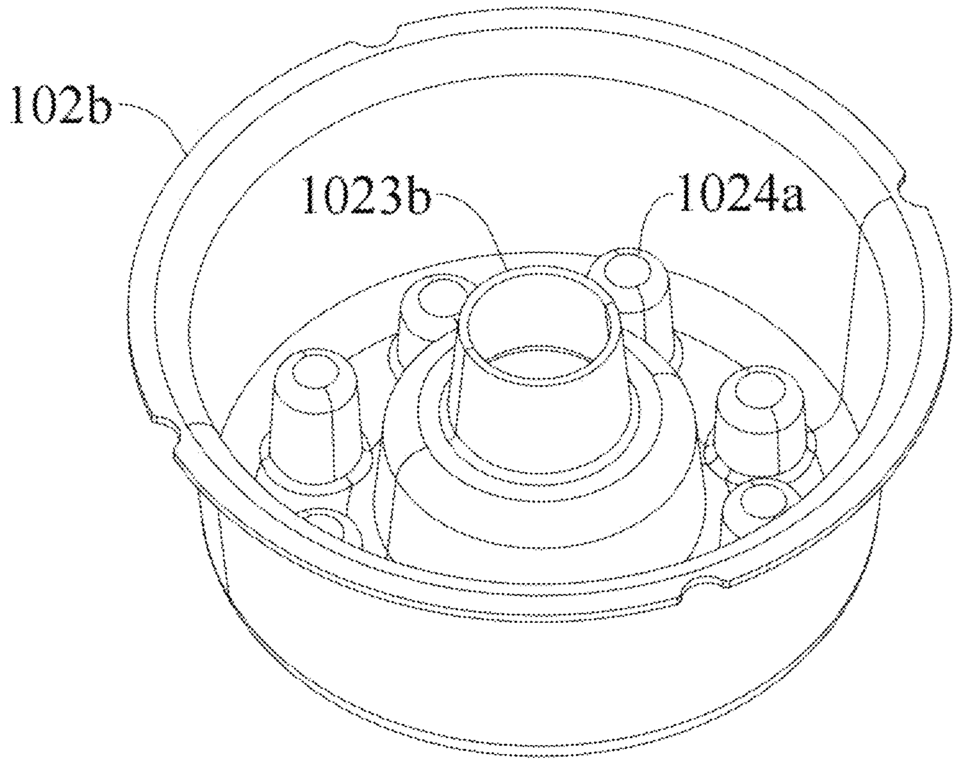
FIG. 11 is a schematic structural diagram of a third type of bowl according to an embodiment of the present application.

In some embodiments, as shown in FIG. 11, the present application also provides a third bowl 102*b*, which is a combination of the first bowl 102 and the second bowl 102*a*. Specifically, the third bowl 102*b* includes multiple thermally conductive columns 1024*a* and a stepped outer tube 1023*b*, with the multiple thermally conductive columns 1024*a* distributed around the outer tube 1023*b*. The combination of the multiple thermally conductive columns 1024*a* and the outer tube 1023*b* not only performs its respective functions, but also further improves the speed of fragrance volatilization.

Figure 12:
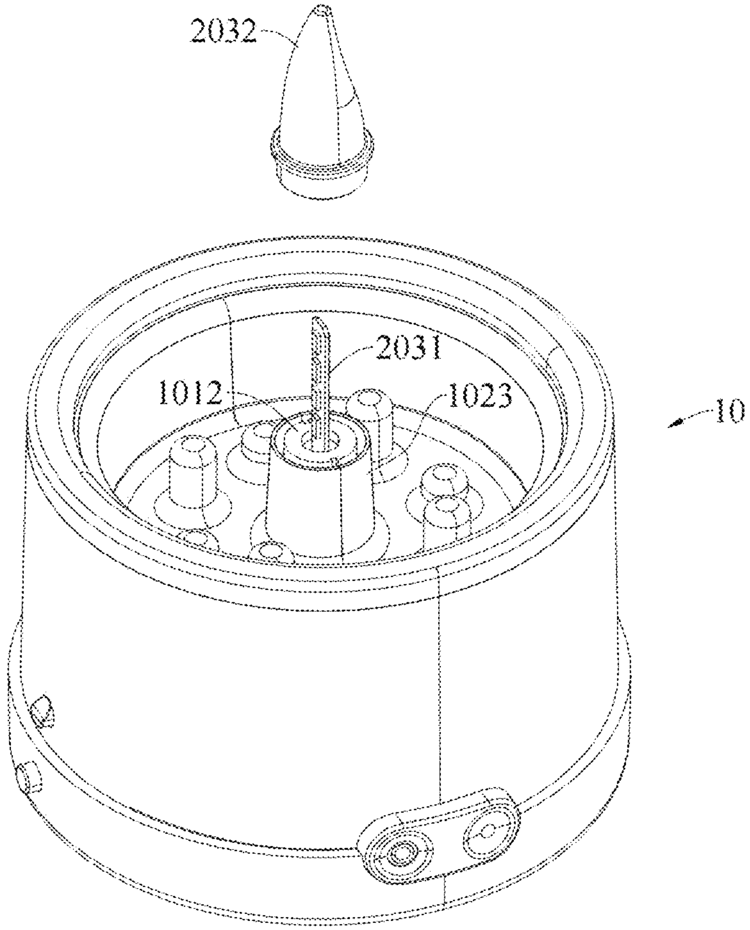
FIG. 12 is a schematic diagram of a structure of an illuminated wax melt warmer in an embodiment of the present application.

As shown in FIG. 12, in some embodiments, a light 203 is provided at the top of the inner tube 1012. The light 203 includes a core unit 2031, which is electrically connected to the circuit board 201. In the embodiment of the present application, the light source of the core unit 2031 is an LED light bead. The fixed end of the core unit 2031 is mounted on the inner side of the inner tube 1012, and the light source of the core unit 2031 extends from the top of the inner tube 1012. A lightshade 2032 is provided on the outside of the core unit 2031. The lightshade 2032 is inserted between the outer tube 1023 and the inner tube 1012. In some embodiments, the lightshade 2032 is snap-fitted or threadedly connected to the inner tube 1012 and/or the outer tube 1023, allowing for replacement of the lightshade 2032 with different shapes or colors. Correspondingly, in some embodiments, the at least one button 205 also includes a light button 2052 for controlling at least one function of the light core unit 2031, such as on/off, brightness, or color.

Figure 2:
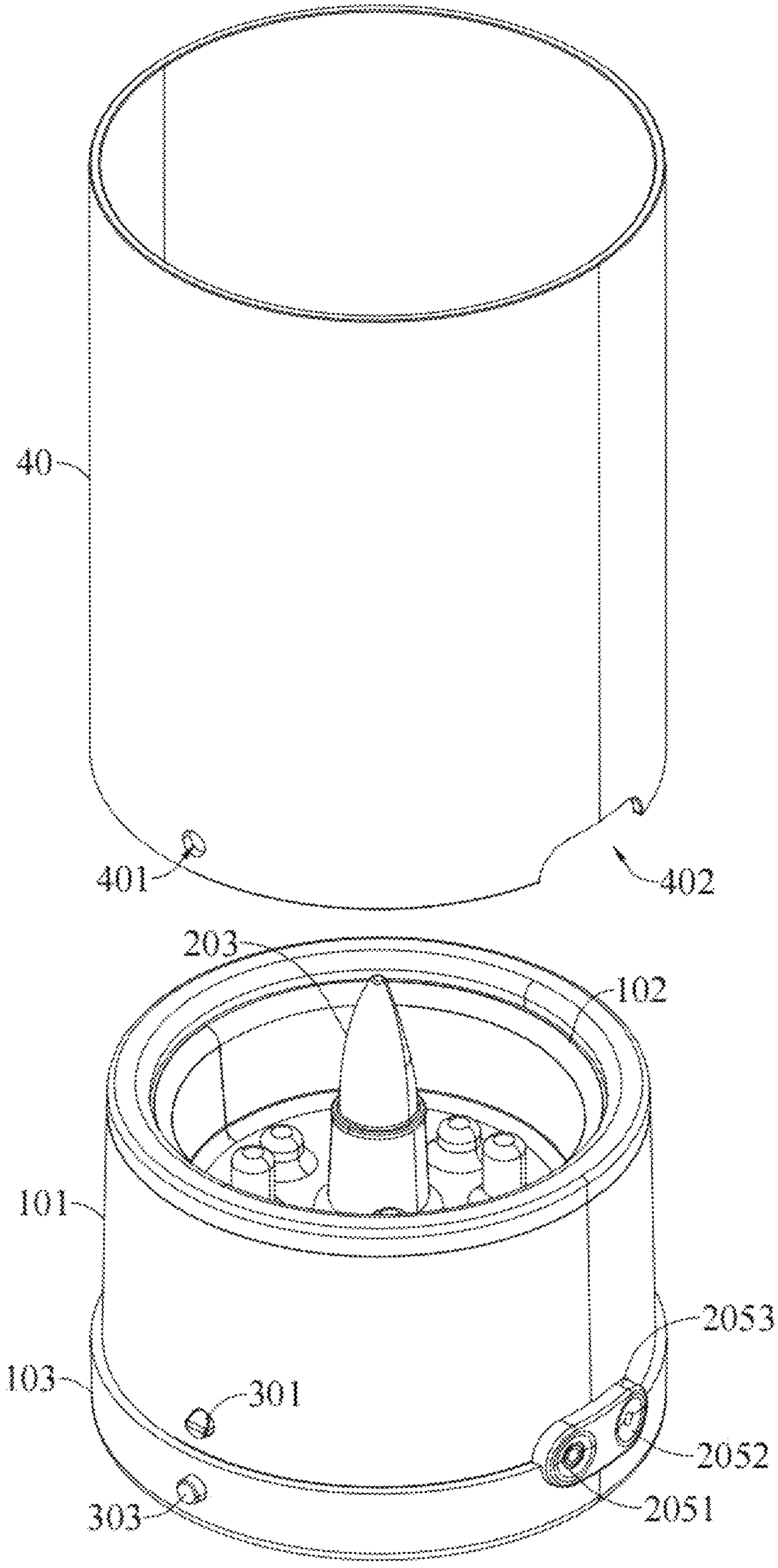
FIG. 2 is a schematic diagram of a state where an outer cover and a base are separated in an embodiment of the present application.
Figure 13:
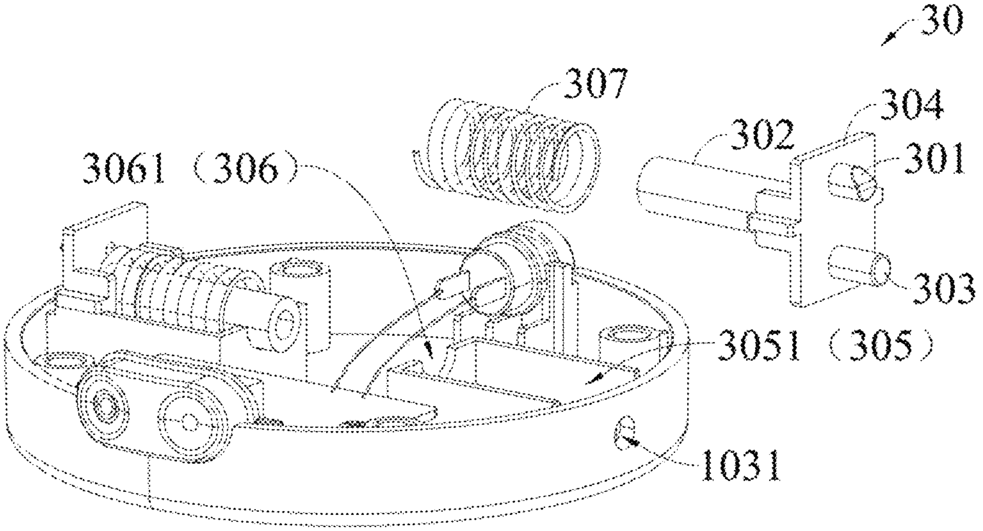
FIG. 13 and FIG. 14 are schematic diagrams of an internal structure of a base and a partial structural diagram of a lock assembly in an embodiment of the present application.
Figure 14:
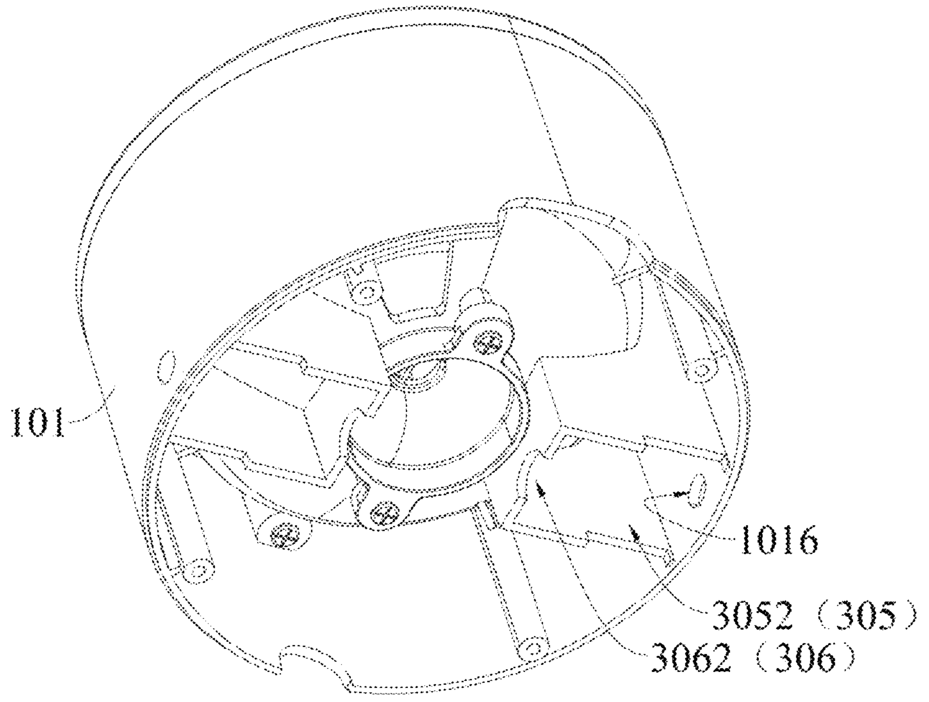

As shown in FIG. 2, an outer cover 40 is provided above the base 10. In some embodiments, the outer cover 40 is detachably connected to the base 10. Specifically, as shown in FIG. 13 and FIG. 14, the illuminated wax melt warmer of the present application is provided with a lock assembly 30. The lock assembly 30 includes a lock tongue 301 and a lock hole 401. The lock tongue 301 is provided in the base 10, and the lock hole 401 is provided on the side of the outer cover 40. The base 10 is provided with a first guide hole 1016, which is provided on the side of the upper housing 101. The outer cover 40 is sleeved over the outside of the upper housing 101, and the first guide hole 1016 is aligned with the lock hole 401. The locking tongue 301 can selectively extend out of the first guide hole 1016 and be inserted into the locking hole 401 to lock the outer cover 40 on the top of the base 10 so that the outer cover 40 cannot be separated from the base 10. The locking tongue 301 can also selectively retract into the base 10 and be separated from the locking hole 401 to release the restriction of the lock assembly 30 on the outer cover 40.

Furthermore, to facilitate operation, the lock assembly 30 also includes a guide rod 302 and a receiving slot 305. The receiving slot 305 extends radially inward from the sidewall of the base 10 and includes a first half-slot 3051 and a second half-slot 3052. The first half-slot 3051 is located in the lower housing 103, while the second half-slot 3052 is located in the upper housing 101. The receiving slot 305 includes a first end and a second end in opposite directions, with the first end located on the sidewall of the base 10. A retaining hole 306 is provided at the second end of the receiving slot 305. The retaining hole 306 includes a first half-hole 3061 and a second half-hole 3062. The first half-hole 3061 is located in the first half-slot 3051, while the second half-hole 3062 is located in the second half-slot 3052. The first end of the guide rod 302 is fixedly connected to the end plate 304, and the lock tongue 301 is located on the side of the end plate 304 facing away from the guide rod 302. The end plate 304 is also provided with a button 303, which is located on the same side of the end plate 304 as the lock tongue 301. The base 10 is provided with a second guide hole 1031, which is located on the side of the lower housing 103. The guide rod 302 is disposed within the receiving slot 305. The lock tongue 301 at the first end of the guide rod 302 extends from the first guide hole 1016, and the button 303 extends from the second guide hole 1031. The second end of the guide rod 302 extends out of the retaining hole 306. The guide rod 302 can slide within the receiving slot 305 within the constraints of the retaining hole 306, the first guide hole 1016, and the second guide hole 1031. A spring 307 is disposed within the receiving slot 305 and is sleeved over the outside of the guide rod 302. One end of the spring 307 abuts the end plate 304, and the other end of the spring 307 abuts the second end of the receiving slot 305. The spring 307 can apply an elastic force to the end plate 304 to keep the locking tongue 301 and the button 303 in the extended state.

Figure 3:
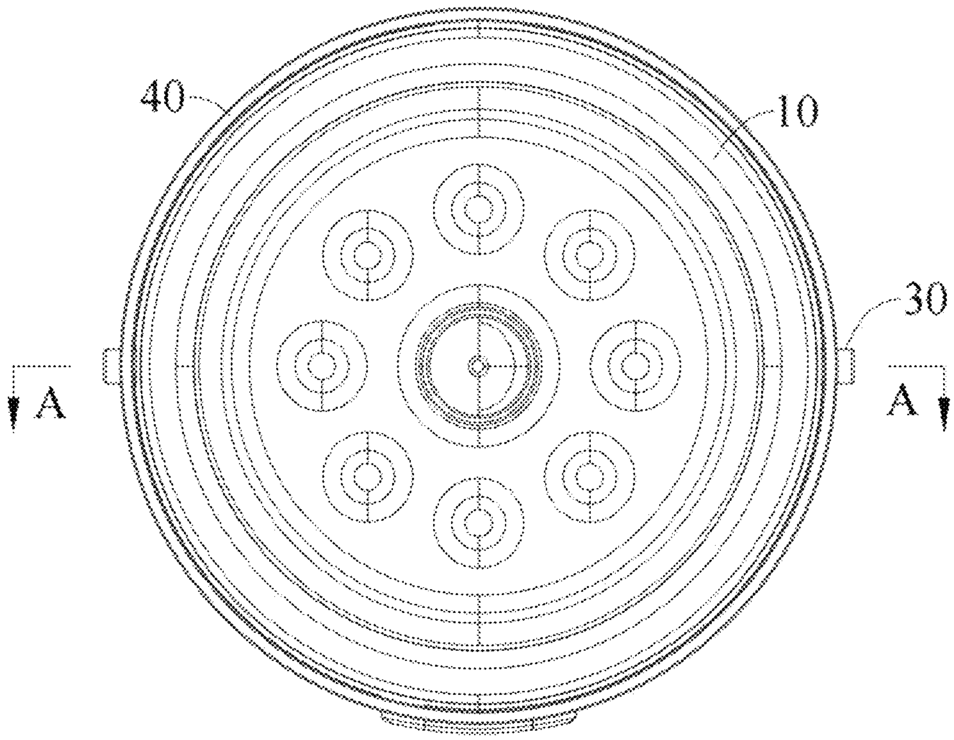
FIG. 3 is a schematic diagram of FIG. 1 from another perspective.
Figure 4:
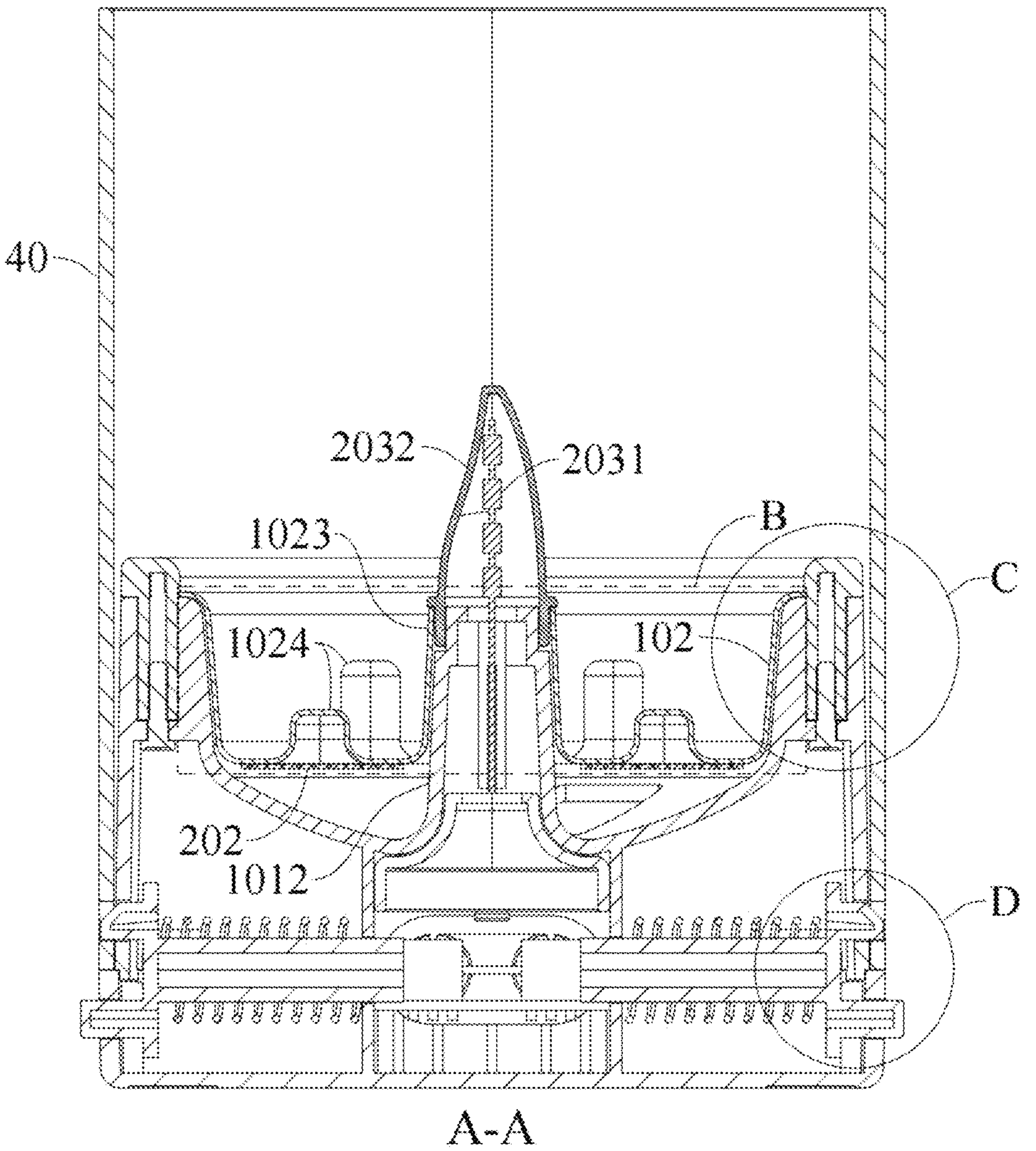
FIG. 4 is a cross-sectional view taken along line AA in FIG. 3.
Figure 15:
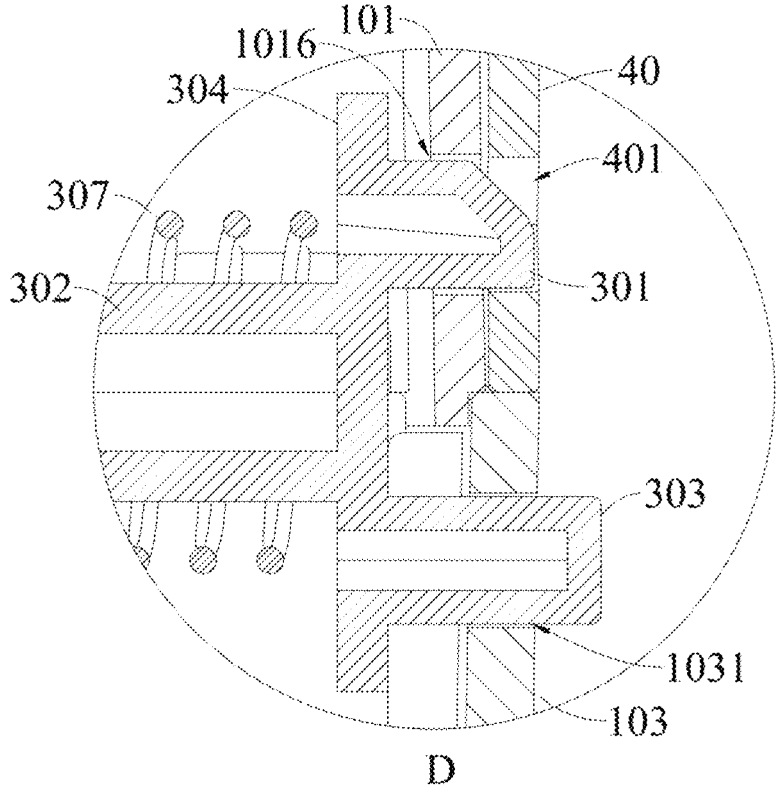
FIG. 15 to FIG. 17 are schematic diagrams of a lock assembly, an outer cover, and a base in different states in an embodiment of the present application.
Figure 16:
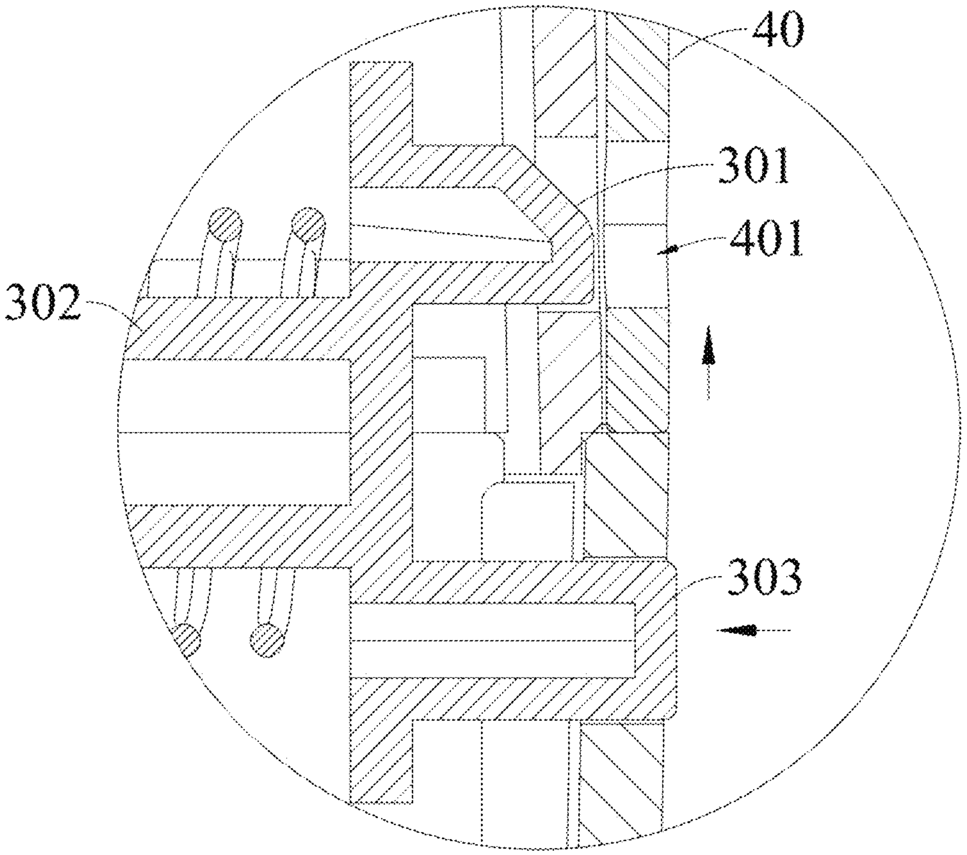
Figure 17:
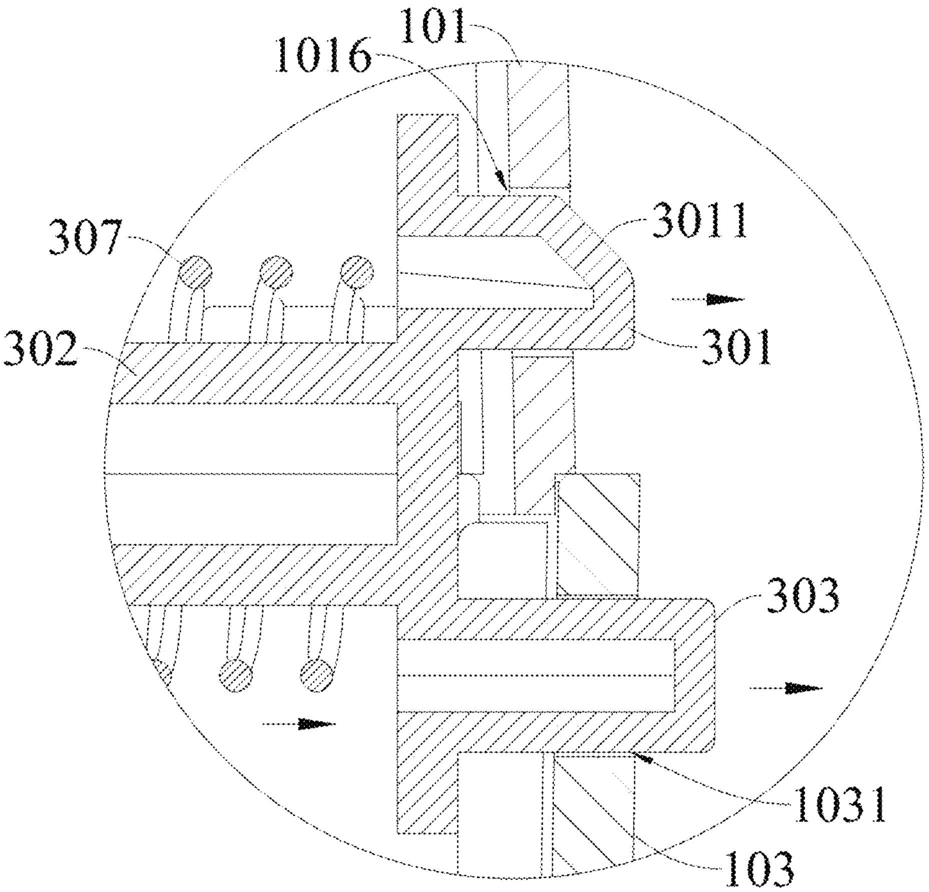

FIGS. 3, 4, and 15, the outer cover 40 is sleeved over the base 10. When the lock assembly 30 is driven by the spring 307, the lock tongue 301 extends into the lock hole 401, and the base 10 and the outer cover 40 remain locked. As shown in FIG. 16, when a pressing force is applied to the button 303, the button 303 drives the end plate 304 to move inward and causes the spring 307 to deform and accumulate force, and the lock tongue 301 and the end plate 304 move inward synchronously and disengage from the lock hole 401. At this point, the locking state between the outer cover 40 and the base 10 is released, and the outer cover 40 can be removed by moving it upward. As shown in FIG. 17, after the pressing force on the button 303 is removed, the spring 307 releases its elastic force and drives the end plate 304 to move, and the lock tongue 301 can be reset.

Generally, the length of the button 303 extending outward from the side of the base 10 is greater than or equal to the length of the lock tongue 301 extending outward from the side of the base 10. When the button 303 is pressed until its end surface is flush with the side of the base 10, the lock tongue 301 can be fully retracted into the first guide hole 1016, thereby ensuring that the lock tongue 301 can completely fall out of the lock hole 401.

In some embodiments, as shown in FIG. 17, the end of the locking tongue 301 is provided with a bevel 3011, located on the side of the locking tongue 301 that faces toward the insertion of the outer cover 40. This bevel 3011 allows the locking tongue 301 to automatically retract and deform the spring 307 to accumulate force when the outer cover 40 is plugged into the base 10. When the outer cover 40 is inserted into the set position, the first guide hole 1016 aligns with the locking hole 401, and the spring 307 releases its elastic force, driving the locking tongue 301 to automatically insert into the locking hole 401, thereby locking the outer cover 40 to the base 10.

In this embodiment, two lock assemblies 30 are provided, and the two lock assemblies 30 are symmetrically distributed. This design can make the locking state of the outer cover 40 and the base 10 more stable. However, this design does not limit the number of lock assemblies 30. In other words, one or more lock assemblies 30 can be selectively provided, and the number of lock assemblies 30 can be determined according to different needs.

In some embodiments, as shown in FIG. 2, a key housing 2053 is provided on the side of the base 10. The heating key 2051 and light key 2052 in the above embodiment are mounted within the key housing 2053. A first notch 402 is provided on the end of the outer cover 40 facing the base 10. When the outer cover 40 is attached to the top of the base 10, at least a portion of the key housing 2053 engages within the first notch 402. Furthermore, in some embodiments, as shown in FIG. 5, the power interface 204 in the above embodiment is provided on the side of the base 10. A second notch 403 is provided on the end of the outer cover 40 facing the base 10. When the outer cover 40 is sleeved over the top of the base 10, at least a portion of the power interface 204 engages within the second notch 403. In this structure, the key housing 2053 and the power interface 204 not only have their own functions but also serve as a positioning mechanism together with the first notch 402 and the second notch 403. This ensures that the lock hole 401 is aligned with the lock tongue 301 when the outer cover 40 is sleeved over the top of the base 10, improving user efficiency.

The foregoing description is merely a few embodiments of the present application and is not intended to limit the present application. Those skilled in the art will readily appreciate that various modifications and variations are possible. Any modifications, equivalent substitutions, or improvements made within the spirit and principles of the present application shall be included within the scope of protection of the present application.

The invention claimed is:

1. An illuminated wax melt warmer comprising:

a base (10), wherein a chamber (1011) is provided at a top of the base (10), and an inner tube (1012) is provided in a middle of the chamber (1011);

a bowl (102) including a cavity (1021), wherein an outer tube (1023) is provided in a middle of the cavity (1021), the outer tube (1023) extends upward from a bottom of the cavity (1021), the bowl (102) is placed in the chamber (1011), and the outer tube (1023) is sleeved over an outside of the inner tube (1012);

a heating element (202) arranged on the bowl (102);

a light (203) mounted on a top of the inner tube (1012); and a circuit board (201), wherein the heating element (202) and the light (203) are electrically connected to the circuit board (201), wherein the cavity (1021) is configured to accommodate fragrance wax (50), and the bowl (102) is configured to melt the fragrance wax (50) under the heating of the heating element (202); and a vertically upwardly protruding structure is provided at the bottom of the cavity (1021), and the protruding structure is configured to increase a contact area between the bowl (102) and the fragrance wax (50).

2. The illuminated wax melt warmer according to claim 1, wherein:

the protruding structure includes a plurality of thermally conductive columns (1024), and each of the plurality of thermally conductive columns (1024) extends upward in a vertical direction from the bottom of the cavity (1021).

3. The illuminated wax melt warmer according to claim 2, wherein:

the plurality of thermally conductive columns (1024) includes at least two thermally conductive columns (1024) of different heights.

4. The illuminated wax melt warmer according to claim 1, wherein:

the protruding structure includes a stepped outer tube (1023), the outer tube (1023) includes at least two steps and extends upward from the bottom of the cavity (1021) with a stepwise decrease in diameter.

5. The illuminated wax melt warmer according to claim 1, wherein:

a portion of the heating element (202) extends into the protruding structure.

6. The illuminated wax melt warmer according to claim 1, further comprising:

an outer cover (40), wherein a bottom of the outer cover (40) is detachably sleeved over an outside of the base (10).

7. An illuminated wax melt warmer comprising:

a base (10), wherein a chamber (1011) is provided at a top of the base (10), and an inner tube (1012) is provided in a middle of the chamber (1011);

a bowl (102) including a cavity (1021), wherein an outer tube (1023) is provided in a middle of the cavity (1021), the outer tube (1023) extends upward from a bottom of the cavity (1021), the bowl (102) is placed in the chamber (1011), and the outer tube (1023) is sleeved over an outside of the inner tube (1012);

a heating element (202) arranged on the bowl (102);

a light (203) mounted on a top of the inner tube (1012);

a circuit board (201), wherein the heating element (202) and the light (203) are electrically connected to the circuit board (201);

an outer cover (40), wherein a bottom of the outer cover (40) is detachably sleeved over an outside of the base (10); and a lock assembly (30);

wherein the cavity (1021) is configured to accommodate fragrance wax (50), and the bowl (102) is configured to melt the fragrance wax (50) under the heating of the heating element (202);

wherein the lock assembly (30) includes a lock tongue (301), a first guide hole (1016), and a lock hole (401); the first guide hole (1016) is arranged on a side surface of the base (10), and the lock hole (401) is arranged on a side surface of the bottom of the outer cover (40), wherein the locking tongue (301) is arranged on the base (10), and the locking tongue (301) includes an extended state where the locking tongue (301) is selectively extends out of the first guide hole (1016) and a retracted state where the locking tongue (301) is retracted from the first guide hole (1016) into the base (10), wherein the outer cover (40) is sleeved on the base (10) such that the first guide hole (1016) is aligned with the lock hole (401); the lock tongue (301) is configured to be inserted into the lock hole (401) to lock the outer cover (40) on the base (10) in the extended state, and to disengage from the lock hole (401) to release the restriction of the lock assembly (30) on the outer cover (40) in the retracted state.

8. The illuminated wax melt warmer according to claim 7, wherein:

the lock assembly (30) further includes a guide rod (302) and an elastic member, the lock tongue (301) is arranged at a first end of the guide rod (302), and the elastic member is configured to apply an elastic force to the guide rod (302) to keep the lock tongue (301) in the extended state.

9. The illuminated wax melt warmer according to claim 8, wherein:

an end plate (304) is provided at the first end of the guide rod (302), the guide rod (302) and the lock tongue (301) are fixed on opposite sides of the end plate (304); a button (303) is provided on the end plate (304), and the button (303) and the lock tongue (301) are located on a same side of the end plate (304), and the base (10) is provided with a second guide hole (1031), the button (303) is configured to extend out of the second guide hole (1031) in the extended state, and the lock tongue (301) is configured to be transformed into the retracted state upon application of pressure on the button (303).

10. The illuminated wax melt warmer according to claim 9, wherein:

the elastic member includes a spring (307), the spring (307) is sleeved over the outside of the guide rod (302), and an end of the spring (307) abuts against the end plate (304) and applies an elastic force to the end plate (304).

11. The illuminated wax melt warmer according to claim 7, wherein:

a bevel (3011) is provided on a side of an end of the locking tongue (301) that is inserted toward the outer cover (40).

12. The illuminated wax melt warmer according to claim 7, wherein:

a key housing (2053) is provided on the side surface of the base (10), a first notch (402) is provided on an end of the outer cover (40) facing the base (10), the outer cover (40) is sleeved over the outside of the base (10), and at least a portion of the key housing (2053) is embedded in the first notch (402).

13. The illuminated wax melt warmer according to claim 7, wherein:

a power interface (204) is provided on the side surface of the base (10), the power interface (204) is electrically connected to the circuit board (201), a second notch (403) is provided on an end of the outer cover (40) facing the base (10), the outer cover (40) is sleeved over the outside of the base (10), and at least a portion of the power interface (204) is embedded in the second notch (403).

14. The illuminated wax melt warmer according to claim 1, wherein:

the base (10) is provided with at least one key (205), and each of at least one key (205) is electrically connected to the circuit board (201).

* * * * *